United States Patent
Yano et al.

(10) Patent No.: US 9,790,944 B2
(45) Date of Patent: Oct. 17, 2017

(54) MOTOR-DRIVEN COMPRESSOR WITH SWITCHING ELEMENT

(71) Applicant: KABUSHIKI KAISHA TOYOTA JIDOSHOKKI, Kariya-shi, Aichi-ken (JP)

(72) Inventors: Junya Yano, Kariya (JP); Tsuyoshi Yamaguchi, Kariya (JP); Tatsuya Koide, Kariya (JP); Ken Suitou, Kariya (JP); Yoshiki Nagata, Kariya (JP)

(73) Assignee: KABUSHIKI KAISHA TOYOTA JIDOSHOKKI, Kariya-shi,Aichi-ken (JP)

( * ) Notice: Subject to any disclaimer, the term of this patent is extended or adjusted under 35 U.S.C. 154(b) by 371 days.

(21) Appl. No.: 14/558,975

(22) Filed: Dec. 3, 2014

(65) Prior Publication Data

US 2015/0159658 A1 Jun. 11, 2015

(30) Foreign Application Priority Data

Dec. 5, 2013 (JP) .................................. 2013-252255

(51) Int. Cl.
*F04D 13/06* (2006.01)
*F04D 15/02* (2006.01)
(Continued)

(52) U.S. Cl.
CPC ........ *F04D 15/0263* (2013.01); *F04C 23/008* (2013.01); *F04C 28/06* (2013.01);
(Continued)

(58) Field of Classification Search
CPC .... F04C 28/28; F04C 23/008; F04C 18/0215; F04C 18/0207; F04C 28/08;
(Continued)

(56) References Cited

U.S. PATENT DOCUMENTS

| | | | | |
|---|---|---|---|---|
| 5,519,301 A | * | 5/1996 | Yoshida | ............... B60H 1/3222 318/811 |
| 8,382,443 B2 | | 2/2013 | Nakano et al. | |

(Continued)

FOREIGN PATENT DOCUMENTS

| | | |
|---|---|---|
| JP | 7-234162 A | 9/1995 |
| JP | 2004-350496 A | 12/2004 |

(Continued)

OTHER PUBLICATIONS

Communication dated Dec. 1, 2015 from the Japanese Patent Office in counterpart application No. 2013-252256.

(Continued)

*Primary Examiner* — Devon Kramer
*Assistant Examiner* — Stephen Mick
(74) *Attorney, Agent, or Firm* — Sughrue Mion, PLLC

(57) ABSTRACT

A motor-driven compressor includes an electric motor driven by a motor driver, which includes a switching element that converts DC voltage from a battery to AC voltage. A temperature detector detects the temperature of the switching element. A voltage detector detects DC voltage applied to the switching element from the battery. A control unit suspends the switching operation of the switching element when the detected temperature rises to a temperature threshold. The control unit reduces counter electromotive force generated by the electric motor. The controller changes the temperature threshold such that the temperature threshold gradually increases from when the detected DC voltage is the highest voltage in the applicable voltage range of the battery to when the detected DC voltage is the lowest voltage in the applicable voltage range.

7 Claims, 2 Drawing Sheets

(51) Int. Cl.
  *F04C 23/00* (2006.01)
  *F04C 28/06* (2006.01)
  *H02P 27/08* (2006.01)
  *H02P 23/00* (2016.01)
  *H02P 29/024* (2016.01)
  *H02P 29/68* (2016.01)
  *F04C 18/02* (2006.01)

(52) U.S. Cl.
  CPC ............ *F04D 13/06* (2013.01); *H02P 23/009* (2013.01); *H02P 27/08* (2013.01); *H02P 29/0241* (2016.02); *H02P 29/68* (2016.02); *F04C 18/0215* (2013.01); *F04C 2270/19* (2013.01); *F04C 2270/70* (2013.01)

(58) Field of Classification Search
  CPC ............ F04C 2270/19; F04C 2240/808; F04C 2240/81; F04C 2270/10; F04C 28/06; F04C 2270/70; F04C 2240/403; F04C 18/06; F04C 2270/105; F04C 2270/195; F04C 2270/23; F04D 15/0263; F04D 13/06; F04D 13/068; H02P 29/68; H02P 29/0241; H02P 23/009; H02P 27/08; F04B 49/02; F04B 49/06; F04B 49/065; F04B 49/10; F04B 2203/0202; F04B 2203/0205; F04B 2207/048
  USPC .................................... 417/35, 411
  See application file for complete search history.

(56) References Cited

U.S. PATENT DOCUMENTS

| 8,947,064 | B2 | 2/2015 | Feldtkeller |
| 2004/0227482 | A1 | 11/2004 | Yoshida et al. |
| 2004/0245949 | A1* | 12/2004 | Ueda ............ H02P 6/182 318/400.14 |
| 2009/0039813 | A1* | 2/2009 | Yamada ............ H02P 29/68 318/434 |
| 2010/0172764 | A1 | 7/2010 | Nakano et al. |
| 2011/0199800 | A1 | 8/2011 | Yahata et al. |
| 2014/0330471 | A1 | 11/2014 | Ozaki |
| 2015/0256070 | A1* | 9/2015 | Lee ............ H02P 27/08 323/283 |

FOREIGN PATENT DOCUMENTS

| JP | 2005-201108 A | 7/2005 |
| JP | 2006-340536 A | 12/2006 |
| JP | 2009-127502 A | 6/2009 |
| JP | 2010-48103 A | 3/2010 |
| JP | 2013-110926 A | 6/2013 |
| KR | 10-2013-0027264 A | 3/2013 |

OTHER PUBLICATIONS

An Office Action dated Jan. 26, 2017, which issued during the prosecution of U.S. Appl. No. 14/558,881.
An Office Action dated Feb. 10, 2017, which issued during the prosecution of U.S. Appl. No. 14/558,811.

* cited by examiner

MOTOR-DRIVEN COMPRESSOR WITH SWITCHING ELEMENT

CROSS-REFERENCE TO RELATED APPLICATIONS

This application is based upon and claims the benefit of priority from prior Japanese Patent Application No. 2013-252255, filed on Dec. 5, 2013, the entire contents of which are incorporated herein by reference.

BACKGROUND OF THE INVENTION

The present invention relates to a motor-driven compressor.

Japanese Laid-Open Patent Publication No. 2005-201108 describes an example of a typical motor-driven compressor including a compression unit, which compresses and discharges a refrigerant, an electric motor, which drives the compression unit, and a motor driver, which drives the electric motor. The motor driver includes switching elements. The switching elements perform switching operations so that the motor driver converts DC voltage of a battery (DC power supply) to AC drive voltage and applies the drive voltage to the electric motor to drive the electric motor.

The switching elements generate heat when performing switching operations. For example, when the switching operation of a switching element generates a large amount of heat, the temperature of the switching element may exceed the withstanding temperature of the switching element. This may damage the switching element.

SUMMARY OF THE INVENTION

The inventors of the present invention have conducted studies on a reference example controller that uses a temperature threshold to stop driving the electric motor. The controller of the electric motor suspends the switching operation of a switching element when, for example, the temperature of the switching element detected by a temperature detector rises to the temperature threshold. Under the assumption that the drive torque of the motor-driven compressor is constant, the switching loss of a switching element increases as the DC voltage applied to the switching element increases. An increase in the switching loss increases the rising rate of the temperature of the switching element. Further, the temperature detected by the temperature detector may differ from the actual temperature of the switching element. Since it is difficult for the controller to accurately obtain the actual temperature of the switching element, the temperature threshold is set as a fixed value that is equal to the output value of the temperature detector when the highest voltage in the applicable voltage range of the battery is applied to the motor-driven compressor.

In the electric motor, the rotation produced by the electric motor generates magnetic flux that generates counter electromotive force. An increase in the rotation speed of the electric motor increases the counter electromotive force. When the counter electromotive force becomes equal to the drive voltage applied to the electric motor, the rotation speed of the electric motor cannot be increased. For example, when the DC voltage is a low voltage in the applicable voltage range of the battery, the counter electromotive force easily becomes equal to the drive force applied to the electric motor, in which case the rotation speed of the electric motor cannot be increased. Such a situation is not desirable.

A field weakening control for reducing the counter electromotive force is known. The field weakening control reduces the counter electromotive force by supplying the electric motor with current from the motor driver to weaken the magnetic flux generated by the rotation of the electric motor. This allows the electric motor to be operated with a high fixed torque and an increased rotation speed even when the DC voltage is a low voltage in the applicable voltage range of the battery.

The amount of current supplied to the electric motor from the motor driver changes or affects the correlation of the actual temperature of the switching element and the temperature detected by the temperature detector. For example, an increase in the amount of current flowing to a circuit board of the motor driver increases the heat transmitted from the circuit board to the temperature detector. This increases the heat generated from the circuit board, increases the heat transmitted from the circuit board to the temperature detector, and raises the temperature of the temperature detector itself. The field weakening control performed when the DC voltage is a low voltage in the applicable voltage range of the battery may increase the temperature of the temperature detector itself. For example, when the temperature of the temperature detector itself rises in correspondence with the current for weakening the magnetic flux supplied from the motor driver to the electric motor, the temperature (output value) detected by the temperature detector may rise and exceed the temperature threshold even though the actual temperature of the switching element is lower than the withstand temperature. In this case, even though there is no need to do so, the switching operation of the switching element is stopped, the electric motor is stopped, and the operation of the motor-driven compressor is stopped.

Accordingly, it is an object of the present invention to provide a motor-driven compressor that can limit unnecessary operation suspensions caused by switching element overheating protection control when the DC voltage applied to the switching elements is a low voltage in an applicable voltage range.

One aspect of the present invention is a motor-driven compressor including an electric motor that drives a compression unit. A motor driver drives the electric motor. The motor driver includes a switching element that converts DC voltage from a battery to AC voltage. A control unit controls the switching operation of the switching element. A temperature detector detects the temperature of the switching element. A voltage detector detects DC voltage applied to the switching element from the battery. The control unit is configured to execute a suspension control that suspends the switching operation of the switching element when the temperature detected by the temperature detector rises to a predetermined temperature threshold, and a field weakening control that reduces counter electromotive force generated by the electric motor. The control unit sets the temperature threshold using a mathematical function having a variable and the DC voltage detected by the voltage detector as the variable. The temperature threshold is set to have a reference threshold value that is equal to the withstand temperature of the switching element, when the DC voltage detected by the voltage detector is the highest voltage in an applicable voltage range of the battery. The temperature threshold gradually increases from the reference threshold value as the DC voltage detected by the voltage detector decreases in the applicable voltage range of the battery.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a motor-driven compressor will now be described with reference to FIGS. 1 to 3. The motor-driven compressor is, for example, installed in a vehicle and used with a vehicle air conditioner.

Figure 1:
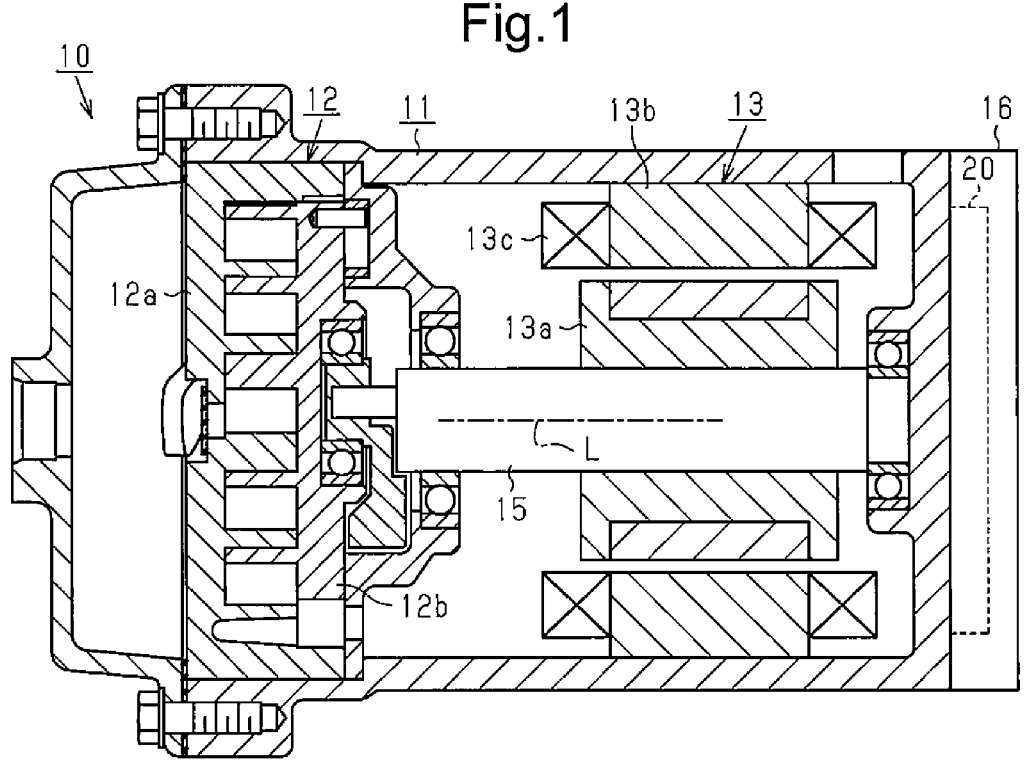
FIG. 1 is a cross-sectional side view showing one embodiment of a motor-driven compressor.

Referring to FIG. 1, a motor-driven compressor 10 includes a compression unit 12, which compresses and discharges a refrigerant, an electric motor 13, which drives the compression unit 12, and a motor driver 20, which drives the electric motor 13. The compression unit 12 and the electric motor 13 are accommodated in a housing 11. The compression unit 12 includes a fixed scroll 12a, which is fixed in the housing 11, and a movable scroll 12b, which is engaged with the fixed scroll 12a. The electric motor 13 includes a rotor 13a, which is fixed to and rotated integrally with a rotation shaft 15, and a stator 13b, which is fixed to the inner surface of the housing 11.

The motor driver 20 may be located, for example, outside the housing 11. In the illustrated example, the motor driver 20 is accommodated in a void defined by a cover 16, which is fixed to an end wall of the housing 11, and the end wall of the housing 11. In the present embodiment, the compression unit 12, the electric motor 13, and the motor driver 20 are arranged in this order in the direction in which the axis L of the rotation shaft 15 extends (axial direction).

Figure 2:
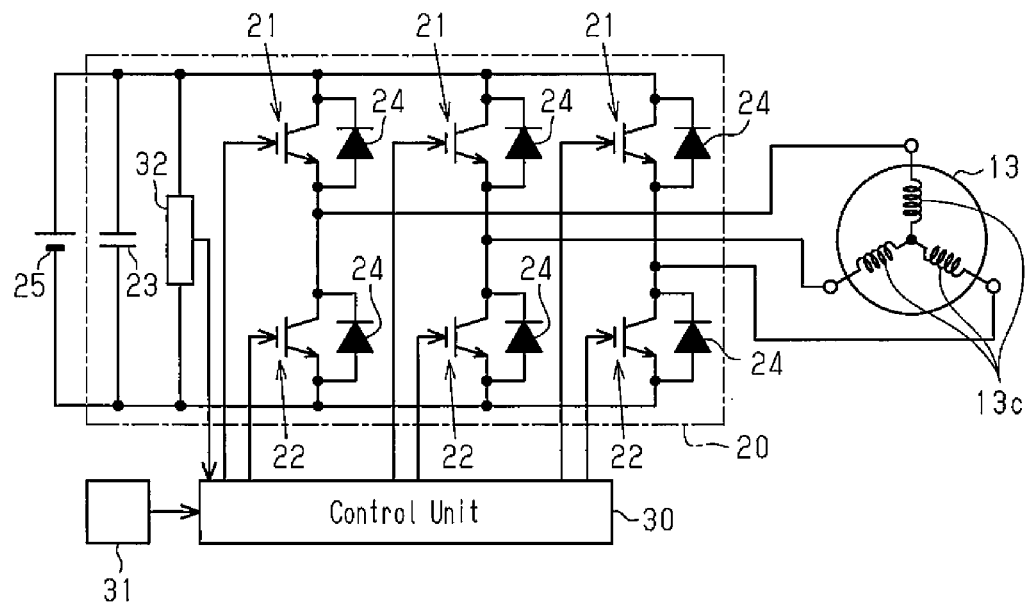
FIG. 2 is a circuit diagram of a motor driver.

As shown in FIG. 2, the motor driver 20 includes switching elements 21 and 22 and a current smoothing capacitor 23. A diode 24 is connected to each of the switching elements 21 and 22. The diode 24 returns the counter electromotive force generated at the electric motor 13, to a battery 25 (DC power supply). The switching elements 21 may be referred to as upper arm switching elements, and the switching elements 22 may be referred to as lower arm switching elements.

The base of each of the switching elements 21 and 22 is signal-connected to a control unit 30, which may be a computer including a processor and a memory. The control unit 30 controls the switching operation of each of the switching elements 21 and 22. The collector of each switching element 21 is connected to the battery 25. The emitter of each switching element 21 is connected to a coil 13c of the electric motor 13. The emitter of each switching element 22 is connected to the battery 25. The collector of each switching element 22 is connected to a coil 13c of the electric motor 13.

The motor driver 20 controls the drive voltage of the electric motor 13 through pulse-width modulation. For example, the motor driver 20 generates a PWM signal from a carrier wave, which may be a high-frequency triangular wave signal, and a voltage designation signal, which designates the voltage that is to be generated. The motor driver 20 provides the PWM signal to each of the switching elements 21 and 22. Each of the switching elements 21 and 22 performs a switching operation in accordance with the PWM signal to convert DC voltage, which is applied to each of the switching elements 21 and 22 from the battery 25, to AC drive voltage. The AC drive voltage obtained in this manner is applied to the electric motor 13 to control and drive the electric motor 13.

The control unit 30 is electrically connected to a temperature detector 31, which detects the temperature of the switching elements 21 and 22. For example, the temperature detector 31 may be a thermistor located proximate to the switching elements 21 and 22. The output of the temperature detector 31 (detected temperature or output value) is provided to the control unit 30.

The temperature detected by the temperature detector 31 may differ from the actual temperature of the switching elements 21 and 22. Further, the control unit 30 stores a set of temperature estimation values, which may be referred to as a set of reference values. The set of temperature estimation values is obtained in advance based on the withstand temperature of the switching elements 21 and 22 and the relationship of the DC voltage of the battery 25 and the temperature detected by the temperature detector 31. For example, the set of temperature estimation values may be determined by converting the actual withstand temperature to the output value of the temperature detector 31 at various DC voltages. In some implementations, the temperature estimation values are associated with different DC voltages of a battery 25, and each temperature estimation value may be equal to or correspond to the temperature detector output value indicating the withstand temperature of the switching elements 21 and 22 at the corresponding DC voltage.

Figure 3:
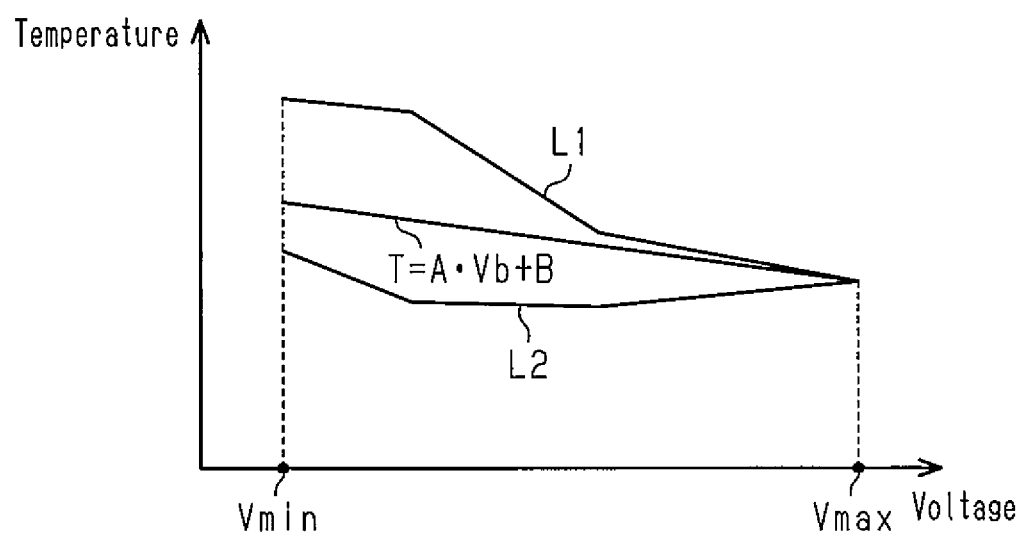
FIG. 3 is a graph illustrating the relationship of the DC voltage of a battery and the temperature threshold.

In FIG. 3, the solid line L1 shows the relationship of the DC voltage of the battery 25 and the temperature estimation value when the drive torque of the motor-driven compressor 10 is fixed and high.

Under the assumption that the drive torque of the motor-driven compressor 10 is fixed, a higher DC voltage of the battery 25 increases the switching loss of the switching elements 21 and 22 and increases the rising rate of the temperature of the switching elements 21 and 22. Thus, the temperature estimation values are set to be lower as the DC voltage of the battery 25 increases.

As shown in FIG. 2, a voltage detector 32, which detects the DC voltage applied to the switching elements 21 and 22 from the battery 25, is electrically connected to the control unit 30. The output (detected voltage or output value) of the voltage detector 32 is sent to the control unit 30.

When the temperature detected by the temperature detector 31 rises and reaches a predetermined temperature threshold T, the control unit 30 executes a suspension control to suspend the switching operation of the switching elements 21 and 22. The temperature threshold T may be a temperature that is lower than or equal to the temperature estimation value.

The temperature threshold T may include a plurality of different values in correspondence with the detected DC voltage. The control unit 30 includes a control program that uses a mathematical function having a variable which is the DC voltage detected by the voltage detector 32 to set the temperature threshold T. The mathematical function may be a linear function of one variable. In the illustrated embodiment of FIG. 3, the temperature threshold T is expressed as $T = A \cdot Vb + B$, where Vb is the variable which is the DC voltage detected by the voltage detector 32, and A and B are constants. The temperature threshold T has a reference threshold value that is equal to the temperature estimation value when the DC voltage detected by the voltage detector 32 is the highest voltage Vmax (e.g., 400 V) in the applicable voltage range of the battery 25 normally used by the motor-driven compressor 10. As illustrated in FIG. 3, the temperature threshold T gradually increases from the reference threshold value as the DC voltage detected by the voltage detector 32 decreases. The temperature threshold T is relatively high when the DC voltage detected by the voltage detector 32 is at or near the lowest voltage Vmin (e.g., 100 V) in the applicable voltage range of the battery 25. The temperature threshold T is set to be closer to the withstanding temperature of the switching elements 21 and 22, or the temperature estimation value corresponding to the DC voltage detected by the voltage detector 32.

The control unit 30 executes a field weakening control to reduce the counter electromotive force generated by the rotation of the electric motor 13. The field weakening control will now be described.

In the electric motor 13, counter electromotive force is generated by a magnetic flux, which is generated by rotation of the electric motor 13. When the DC voltage detected by the voltage detector 32 is a low voltage in the applicable voltage range of the battery 25, an increase in the rotation speed of the electric motor 13 increases the counter electromotive force. When the counter electromotive force becomes equal to the drive voltage applied to the electric motor 13, the rotation speed of the electric motor 13 cannot be increased.

The control unit 30 reduces the counter electromotive force by supplying the electric motor 13 with current for weakening the magnetic flux generated by the rotation of the electric motor 13. Thus, the motor-driven compressor 10 may be driven at higher rotation speed with a fixed and high torque even when the DC voltage is a low voltage in the applicable voltage range of the battery 25.

The operation of the embodiment will now be described.

For example, when the DC voltage applied to the switching elements is a low voltage in the applicable voltage range of the battery 25, or less than a low voltage threshold (for example, 200 V), the control unit 30 executes the field weakening control so that the drive torque of the motor-driven compressor 10 is fixed and high. In the field weakening control, the electric motor 13 is supplied with current from the motor driver 20 to weaken the magnetic flux generated by the rotation of the electric motor 13. The output of the current from the motor driver 20 to the electric motor 13 raises the temperature of the temperature detector 31.

The solid line L2 in FIG. 3 shows the relationship of the DC voltage of the battery 25 and the temperature detected by the temperature detector 31 when the drive torque of the motor-driven compressor 10 is a fixed and high torque.

In this example, the temperature detected by the temperature detector 31 when the DC voltage is a low voltage (e.g., 100 V to 200 V) in the applicable voltage range of the battery 25 is higher than the temperature detected by the temperature detector 31 when the DC voltage is a median voltage (e.g., 200 V to 300 V) in the applicable voltage range of the battery 25. Further, the temperature detected by the temperature detector 31 when the DC voltage is a high voltage (e.g., 300 V to 400 V) in the applicable voltage range of the battery 25 is higher than the temperature detected by the temperature detector 31 when the DC voltage is a median voltage in the applicable voltage range of the battery 25.

For example, if the temperature threshold T is set to be a fixed value that is equal to the temperature estimation value when the DC voltage is the highest voltage Vmax in the applicable voltage range of the battery 25 regardless of the detected DC voltage, even though a sufficient margin exists between the temperature of the switching elements 21 and 22 and the withstand temperature (temperature estimation value), the temperature detected by the temperature detector 31 may rise to the first temperature threshold T1. In this case, the control unit 30 executes the suspension control and suspends the operation of the motor-driven compressor 10.

However, the control unit 30 of the present embodiment uses the mathematical function having a variable which is the DC voltage detected by the voltage detector 32 to set the temperature threshold T to avoid such an undesirable situation. That is, the mathematical function is configured such that the temperature threshold T has a reference threshold value that is equal to the temperature estimation value when the DC voltage detected by the voltage detector 32 is the highest voltage Vmax in the applicable voltage range of the battery 25 normally used by the motor-driven compressor 10. The mathematical function is configured such that the temperature threshold T increases from the reference threshold value as the DC voltage detected by the voltage detector 32 decreases in the applicable voltage range of the battery 25. This limits execution of the suspension control by the control unit 30 when a sufficient margin exists between the temperature of the switching elements 21 and 22 and the withstand temperature. As a result, suspension of the operation of the motor-driven compressor 10 is limited when a sufficient margin exists between the temperature of the switching elements 21 and 22 and the withstand temperature.

The above embodiment has the following advantages.

(1) The control unit 30 uses the mathematical function having a variable which is the DC voltage detected by the voltage detector 32 to set the temperature threshold T. The mathematical function is configured such that the temperature threshold T has a reference threshold value that is equal to the temperature estimation value when the DC voltage detected by the voltage detector 32 is the highest voltage Vmax in the applicable voltage range of the battery 25 normally used by the motor-driven compressor 10. The mathematical function is configured such that the temperature threshold T increases from the reference threshold value as the DC voltage detected by the voltage detector 32 decreases in the applicable voltage range of the battery 25. Thus, in comparison to when, for example, the temperature threshold T is set to be a fixed value that is equal to the temperature estimation value when the DC voltage is the highest voltage Vmax in the applicable voltage range of the battery 25 regardless of the detected DC voltage, execution of the suspension control by the control unit 30 is limited when a sufficient margin exists between the temperature of the switching elements 21 and 22 and the withstand temperature. As a result, if the DC voltage is a low voltage in the applicable voltage range of the battery 25, suspension of the operation of the motor-driven compressor 10 is limited when a sufficient margin exists between the temperature of the switching elements 21 and 22 and the withstand temperature.

(2) The mathematical function is configured such that the temperature threshold T is set to be closer to the temperature estimation value corresponding to the DC voltage detected by the voltage detector 32. This reduces the gap between the temperature threshold T and the withstand temperature of the switching elements 21 and 22, and therefore expands an operating range of the motor-driven compressor 10.

(3) The control unit 30 stores the linear function for setting the temperature threshold T. This reduces the number of processes for preparing a control program. Nevertheless, multiple temperature thresholds T may be set in the control unit 30 in correspondence with different DC voltages of the battery 25.

It should be apparent to those skilled in the art that the present invention may be embodied in many other specific forms without departing from the scope of the invention. Particularly, it should be understood that the present invention may be embodied in the following forms.

The control unit 30 may use a quadratic function having a variable which is the DC voltage detected by the voltage detector 32 to set the temperature threshold T.

The temperature detector 31 may be, for example, a thermocouple or a radiation thermometer.

When the cover 16 is fixed to the circumferential wall of the housing 11, the motor driver 20 may be accommodated in the void defined by the circumferential wall of the housing 11 and the cover 16.

The compression unit 12 may be, for example, of a piston type, a vane type, or the like.

The motor-driven compressor 10 does not have to be used with a vehicle air conditioner and may be used with a different type of air conditioner.

The control unit 30 may include a computer processor configured to execute control method(s) or control program(s). The control unit 30 may include computer-readable media for carrying or having computer-executable instructions or data structures stored thereon. Such computer-readable media can be any available media that can be accessed by a general purpose or special purpose computer such as the computer processor of the control unit 30. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

The above description is intended to be illustrative and not restrictive. For example, the above-described examples (or one or more aspects thereof) may be used in combination with each other. Other embodiments can be used, such as by one of ordinary skill in the art upon reviewing the above description. Also, in the above description of the embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The invention claimed is:

1. A motor-driven compressor comprising:
an electric motor that drives a compression unit;
a motor driver that drives the electric motor, wherein the motor driver includes a switching element that converts DC voltage from a battery to AC voltage;
a control unit that controls the switching operation of the switching element;
a temperature detector that detects the temperature of the switching element; and
a voltage detector that detects DC voltage applied to the switching element from the battery;
wherein the control unit is configured to execute
a suspension control that suspends the switching operation of the switching element when the temperature detected by the temperature detector rises to a temperature threshold, and
a field weakening control that reduces counter electromotive force generated by the electric motor wherein when the field weakening control is executed, the electric motor that drives the compression unit is operated at a fixed torque; and
the control unit sets the temperature threshold using a mathematical function having a variable and the DC voltage detected by the voltage detector as the variable, wherein
the temperature threshold is set to have a reference threshold value that is equal to a withstand temperature of the switching element, when the DC voltage detected by the voltage detector is the highest voltage in an applicable voltage range of the battery, and
the temperature threshold gradually increases from the reference threshold value as the DC voltage detected by the voltage detector decreases in the applicable voltage range of the battery.

2. The motor-driven compressor according to claim 1, wherein the control unit sets the temperature threshold to be closer to the withstand temperature of the switching element corresponding to the DC voltage detected by the voltage detector.

3. The motor drive compressor according to claim 1, wherein the mathematical function is a linear function.

4. The motor drive compressor according to claim 1, wherein the mathematical function is a linear function of one variable.

5. A motor-driven compressor comprising:
an electric motor that drives a compression unit;
a motor driver that drives the electric motor, wherein the motor driver includes a switching element that converts DC voltage from a battery to AC voltage, the DC voltage to be applied to the switching element being in a certain applicable range between a highest voltage and a lowest voltage;
a control unit that controls the switching operation of the switching element;
a temperature detector that detects the temperature of the switching element; and
a voltage detector that detects DC voltage applied to the switching element;
wherein the control unit is configured to
execute a suspension control that suspends the switching operation of the switching element when the temperature detected by the temperature detector rises to a temperature threshold,
execute a field weakening control that reduces counter electromotive force generated by the electric motor when the voltage detected by the voltage detector is less than a low voltage threshold wherein when the field weakening control is executed, the electric motor that drives the compression unit is operated at a fixed torque, and
change the temperature threshold in accordance with the DC voltage detected by the voltage detector,
wherein the temperature threshold has a lowest value when the DC voltage detected by the voltage detector is the highest voltage in the applicable voltage range, and the temperature threshold gradually increases from the lowest value as the DC voltage detected by the voltage detector decreases in the applicable voltage range.

6. The motor drive compressor according to claim 5, wherein the temperature threshold linearly increases from the lowest value when the DC voltage detected by the voltage detector decreases from the highest voltage to the lowest voltage in the applicable voltage range.

7. The motor drive compressor according to claim 5, wherein the lowest value of the temperature threshold is set to be equal to an output value of the temperature detector indicating a withstand temperature of the switching element when the DC voltage detected by the voltage detector is the highest voltage in the applicable voltage range.

* * * * *